(12) United States Patent
Foster et al.

(10) Patent No.: US 9,043,851 B2
(45) Date of Patent: May 26, 2015

(54) METHODS, SYSTEMS, AND COMPUTER READABLE MEDIA FOR MEASURING MULTICAST LATENCY

(75) Inventors: Catherine Elaine Foster, Burnaby (CA); Mark Leslie Phillips, Oakleigh South (AU)

(73) Assignee: Ixia, Calabasas, CA (US)

(*) Notice: Subject to any disclaimer, the term of this patent is extended or adjusted under 35 U.S.C. 154(b) by 265 days.

(21) Appl. No.: 13/286,148

(22) Filed: Oct. 31, 2011

(65) Prior Publication Data

US 2012/0311621 A1 Dec. 6, 2012

Related U.S. Application Data (60) Provisional application No. 61/491,875, filed on May 31, 2011.

(51) Int. Cl.
| | |
|---|---|
| *H04H 60/32* | (2008.01) |
| *H04L 29/06* | (2006.01) |
| *H04N 21/438* | (2011.01) |
| *H04N 21/61* | (2011.01) |
| *H04N 21/6377* | (2011.01) |
| *H04N 21/6405* | (2011.01) |
| *H04N 21/6587* | (2011.01) |
| *H04H 20/12* | (2008.01) |
| *H04H 20/82* | (2008.01) |

(52) U.S. Cl.
CPC ........ *H04L 65/4076* (2013.01); *H04N 21/4383* (2013.01); *H04N 21/6125* (2013.01); *H04N 21/6175* (2013.01); *H04N 21/6377* (2013.01); *H04N 21/6405* (2013.01); *H04N 21/6587* (2013.01); *H04H 20/12* (2013.01); *H04H 20/82* (2013.01); *H04L 65/80* (2013.01)

(58) Field of Classification Search
CPC .......... H04N 21/4383; H04N 21/6125; H04N 21/6175; H04N 21/6377; H04N 21/6405; H04N 21/6587
USPC .............................................. 725/14, 38, 107
See application file for complete search history.

(56) References Cited

U.S. PATENT DOCUMENTS

| | | | |
|---|---|---|---|
| 7,111,204 B1* | 9/2006 | Couturier et al. ............... | 714/39 |
| 2008/0031151 A1* | 2/2008 | Williams ..................... | 370/252 |

OTHER PUBLICATIONS

"IxN2X," Ixia, PN: 915-3035, Rev. A, pp. 1-4 (Apr. 2011).
"Agilent N2X IPTV & IPTVv6 Quality of Experience (QoE) Test Solution," Agilent Technologies, pp. 1-10 (May 20, 2009).
"Agilent N2X IPTV QoE Test Solution," Agilent Technologies, pp. 1-2.

(Continued)

*Primary Examiner* — Nasser Goodarzi
*Assistant Examiner* — Michael B Pierorazio
(74) *Attorney, Agent, or Firm* — Jenkins, Wilson, Taylor & Hunt, P.A.

(57) ABSTRACT

Methods, systems, and computer readable media for measuring multicast latency are disclosed. According to one method, the method includes emulating one or more Internet protocol television (IPTV) user devices by generating channel leave and join requests. The method further includes monitoring network responses to the channel leave and join requests and calculating, during a cycle of channel leave and join requests for a user device and prior to repeating the cycle, at least one metric of latency associated with the channel leave and join requests.

21 Claims, 5 Drawing Sheets

(56) References Cited

OTHER PUBLICATIONS

Christensen et al., "Considerations for Internet Group Management Protocol (IGMP) and Multicast Listener Discovery (MLD) Snooping Switches," RFC 4541, pp. 1-17 (May 2006).

Vida et al., "Multicast Listener Discovery Version 2 (MLDv2) for IPv6," RFC 3810, pp. 1-63 (Jun. 2004).

Cain et al., "Internet Group Management Protocol, Version 3," RFC 3376, pp. 1-54 (Oct. 2002).

Deering et al., "Multicast Listener Discovery (MLD) for IPv6," RFC 2710, pp. 1-23 (Oct. 1999).

Hoffman et al., "RTP Payload Format for MPEG1/MPEG2 Video," RFC 2250, pp. 1-17 (Jan. 1998).

Fenner, "Internet Group Management Protocol, Version 2," RFC 2236, pp. 1-25 (Nov. 1997).

"Ixia IxN2X IPTV & IPTVv6 Quality of Experience (QoE) Test Solution," http://www.ixiacom.com/products/display?skey=ixn2x_iptv_qoa_pa, pp. 1-8 (Publication Date Unknown, Downloaded from the Internet May 31, 2011).

* cited by examiner

METHODS, SYSTEMS, AND COMPUTER READABLE MEDIA FOR MEASURING MULTICAST LATENCY

PRIORITY CLAIM

This application claims the benefit of U.S. Provisional Patent Application Ser. No. 61/491,875, filed May 31, 2011; the disclosure of which is incorporated herein by reference in its entirety.

TECHNICAL FIELD

The subject matter described herein relates to testing communications networks. More specifically, the subject matter relates to methods, systems, and computer readable media for measuring multicast latency.

BACKGROUND

Internet protocol television (IPTV) and other media-providing technologies can require significant infrastructure and configuration. Generally, network operators test various aspects of their network equipment to ensure reliable and efficient operation. In particular, network operators may test their network equipment for delay or latency when experiencing various amounts of usage. For example, in an IPTV environment, users may change channels (e.g., IP streams multicasted to IPTV users), such as by sending channel commands or IPTV related command messages. Channel commands may trigger multicast events. For example, a channel leave request message may trigger an IPTV node (e.g., a content router) to disassociate the user with a first channel or multicast group and a channel join request message may trigger the IPTV node to associate the user with a second channel or multicast group. After processing the channel leave request and the channel join request messages, the user may receive data associated with the second channel. During the channel changing process, various delays or latencies may occur. Some delays may be unavoidable, such as user related delay, while other delays may be caused or exacerbated by network conditions or configurations.

Network operators typically simulate various conditions before equipment is deployed in a live network to decrease avoidable delays and/or other problems. However, current IPTV equipment simulation and testing methods are not capable of simulating IPTV related commands from user devices and calculating related metrics in real-time or near real-time. Various issues may arise from delayed testing feedback which may be costly for network operators and result in dissatisfied users.

Accordingly, in light of these difficulties, a need exists for improved methods, systems, and computer readable media for measuring multicast latency.

SUMMARY

Methods, systems, and computer readable media for measuring multicast latency are disclosed. According to one method, the method includes emulating one or more Internet protocol television (IPTV) user devices by generating channel leave and join requests. The method further includes monitoring network responses to the channel leave and join requests and calculating, during a cycle of channel leave and join requests for a user device and prior to repeating the cycle, at least one metric of latency associated with the channel leave and join requests.

A system for measuring multicast latency is also disclosed. The system includes an emulation module configured to emulate one or more Internet protocol television user devices by generating channel leave and join requests. The system also includes a measurement module embodied in a non-transitory computer readable medium configured to monitor network responses to the channel leave and join requests and to calculate, during a cycle of channel leave and join requests for a user device and prior to repeating the cycle, at least one metric of latency associated with the channel leave and join requests.

The subject matter described herein may be implemented in software in combination with hardware and/or firmware. For example, the subject matter described herein may be implemented in software executed by a processor. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, the terms "function" or "module" refer to software in combination with hardware and/or firmware for implementing features described herein.

BRIEF DESCRIPTION OF THE DRAWINGS

The subject matter described herein will now be explained with reference to the accompanying drawings of which.

DETAILED DESCRIPTION

The subject matter described herein discloses methods, systems, and computer readable media for measuring multicast latency. When testing IPTV access networks and other video over packet delivery equipment, it is desirable to test the response of the network and other equipment to user requests to stop monitoring transmissions on one channel and start on a new channel. IPTV networks may include multiple users simultaneously watching video over different channels, and it is desirable to generate metrics of the network's response in real time.

In order to achieve these goals, the subject matter described herein may include an emulation and measurement device that emulates IPTV user devices by sending channel leave and join requests over a network. The emulation and measurement device may measure and/or calculate latency or other metrics based on network responses. The emulation and measurement device may perform such calculations during a cycle of channel changes for a given user device rather than waiting until the cycle repeats. Calculating the various latency metrics before cycle repetition decreases the amount of information that must be cached at a given time and provides metrics in real time or near real time.

In some embodiments, emulation and measurement device may efficiently use resources (e.g., memory) when performing latency related calculations. For example, data associated with the previous and current channels for each emulated IPTV user device may be stored or cached. Metrics (e.g., a set top box delay or channel join delay) may be computed using the data and, after the data, or a portion thereof, is no longer needed, the data, or a portion thereof, may be compressed or deleted.

In some embodiments, data may be stored or maintained until a trigger is met. For example, a trigger may include a multicast event or test event, such as a channel leave and join request for a new current channel by an emulated user device. In response to changing to the new current channel, the old current channel may become the new previous channel data and the old previous channel data may be compressed or deleted. In another example, a trigger may be met when all calculations associated with some stored data are performed. In response to performing all the calculations associated with the stored data, the stored data, or portion thereof, may be compressed or deleted. By storing a minimal amount of data (e.g., state information and timestamps) associated with channel leave and channel join requests, the present subject matter described herein requires significantly less resources (e.g., memory) than conventional solutions.

Figure 1:
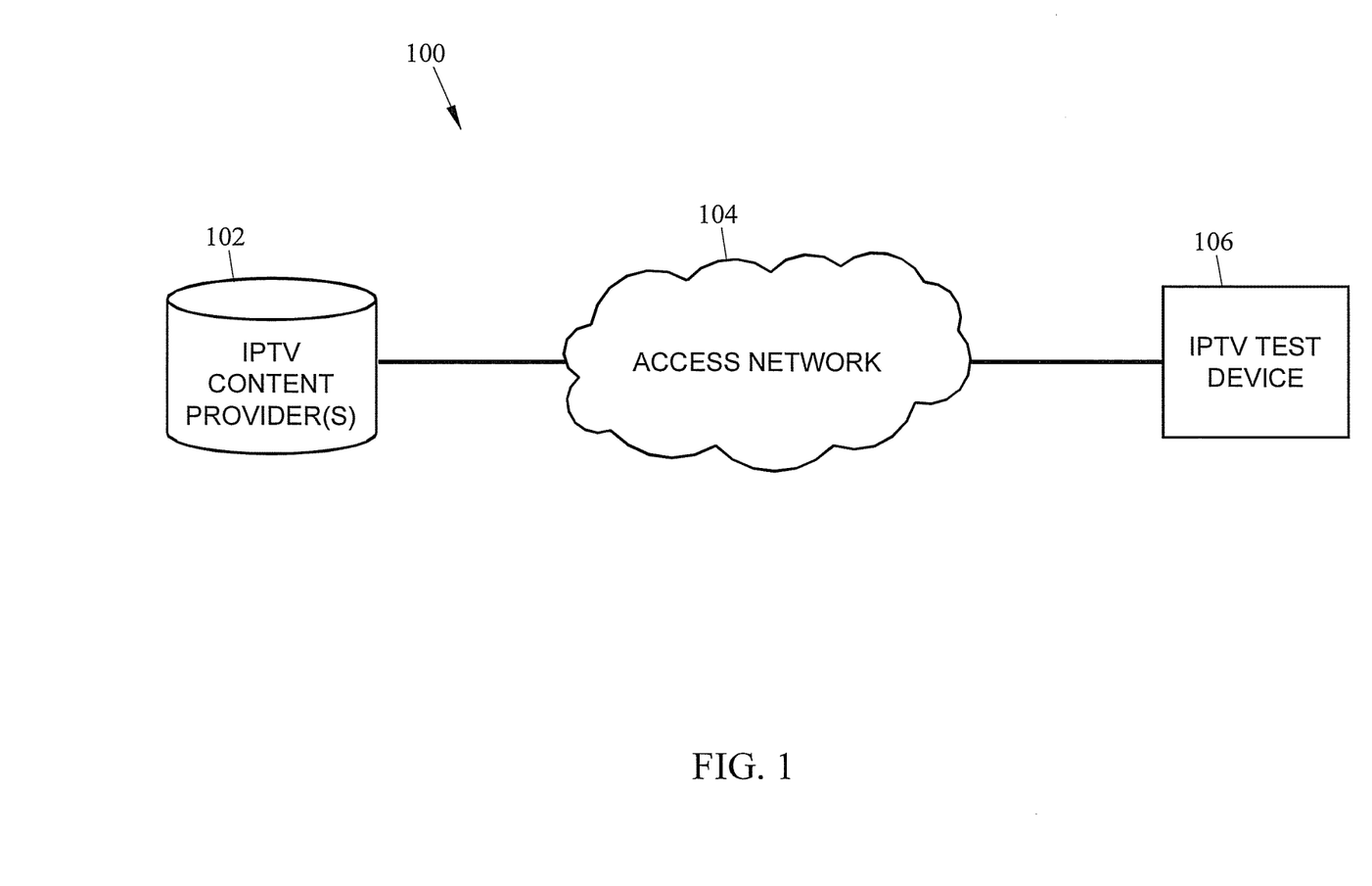
FIG. 1 is a diagram illustrating exemplary IPTV network for measuring multicast latency according to an embodiment of the subject matter described herein.

FIG. 1 is a diagram illustrating an exemplary IPTV network 100 for measuring multicast latency according to an embodiment of the subject matter described herein. Network 100 may include one or more IPTV content provider(s) 102, an access network 104, and an IPTV test device 106. IPTV content provider(s) 102 may represent any suitable entity for providing IPTV content or other media. Exemplary content providers may include a server, a router, or other communications node. In some embodiments, IPTV content provider(s) 102 may be a single node or may be distributed across multiple computing platforms or nodes. IPTV content provider(s) 102 may use various protocols and/or interfaces. Exemplary protocols include IP (e.g., IPv4, IPv6, IP multicast and IP unicast), Internet group management protocol (IGMP), multicast listener discovery (MLD) protocol, real time protocol (RTP), real time streaming protocol (RTSP), user datagram protocol (UDP), and protocol independent multicast (PIM). For example, IPTV content provider(s) 102 may send channel data (e.g., a stream of related packets) using IP multicast or unicast. The channel data may include video or other content in various formats, such as MPEG-2, H.264, Ogg-Theora, MPEG-4, and/or others.

Access network 104 may represent any network that includes one or more suitable entities (e.g., routers, gateways, servers, or communications nodes) for transporting data between IPTV content provider(s) 102 and IPTV test device 106. For example, access network 104 may be a wireless (e.g., a cellular network) or wired network (e.g., an xDSL or Fiber network). Access network 104 may provide IPTV and/or other content or services to one or more users or user devices.

In some embodiments, access network 104 may include various routes or links between IPTV content provider(s) 102 and IPTV test device 106. For example, access network 104 may include a plurality of routers interconnected in various ways or topologies. Exemplary network topologies may include mesh, line, fully-connected, hybrid, or another topology.

IPTV test device 106 may be any suitable entity (e.g., a stand-alone node or distributed multi-node system) configured to emulate one or more IPTV user devices, monitor network responses (e.g., data from IPTV content provider(s) 102), determine multicast latency, and/or perform other measurements or calculations. In some embodiments, IPTV test device 106 may be a single node or may be distributed across multiple computing platforms or nodes. IPTV test device 106 may include various modules for performing one or more aspects described herein. For example, IPTV test device 106 may include an emulation module and a monitor and/or measurement module. IPTV test device 106 may include one or more signaling interfaces for communicating with access network 104, IPTV content provider(s) 102, and/or other nodes. For example, IPTV test device 106 may include multiple IP ports or other connection interfaces for receiving and sending packets via access network 104 or nodes (e.g., routers) therein.

Figure 2:
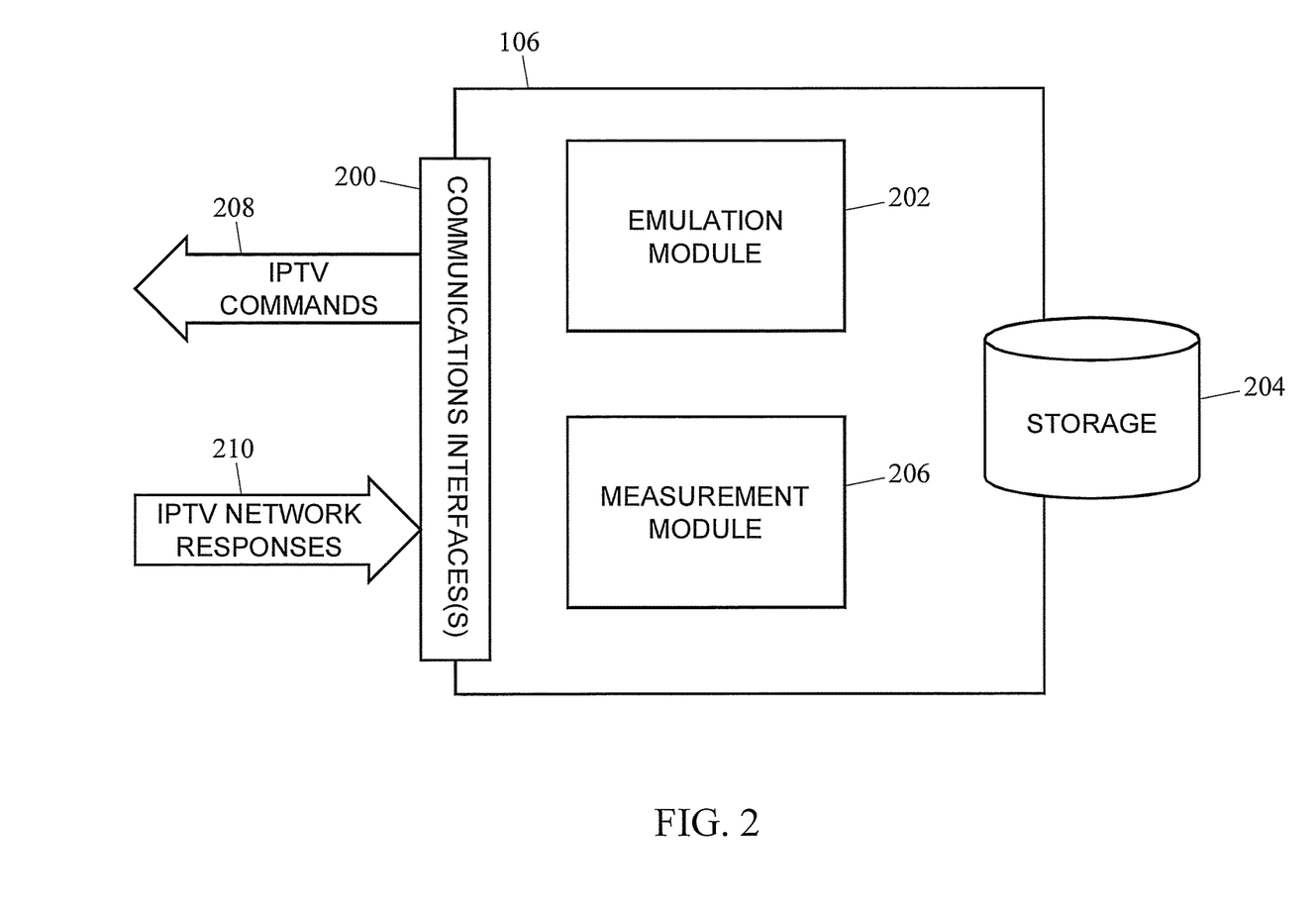
FIG. 2 is a diagram illustrating an exemplary node for measuring multicast latency according to an embodiment of the subject matter described herein.

FIG. 2 is a diagram illustrating an exemplary node for measuring multicast latency according to an embodiment of the subject matter described herein. In this embodiment, exemplary node may be IPTV test device 106. IPTV test device 106 may be any suitable node or system capable of emulating IPTV user devices by generating IPTV commands (e.g., leave and channel join requests) and monitoring and measuring multicast latency and/or other metrics based on network responses. In some embodiments, IPTV test device 106 may include various modules and/or components for performing one or more aspects described herein.

IPTV test device 106 may include one or more communications interface(s) 200, an emulation module 202, a measurement module 206, and storage 204. Communications interface(s) 200 may be any suitable entity usable for communicating with one or more nodes, networks, and/or modules. For example, communications interface(s) 200 may be configured to communicate (e.g., sending or receiving IP multicast or IGMP messages) with various routers in access network 104 and/or IPTV content provider(s) 102.

Emulation module 202 may be any suitable entity (e.g., software executing on one or more processor) for emulating one or more user devices. For example, emulation module 202 may generate one or more IPTV command or channel messages, such as a channel leave request or a channel join request. IPTV command messages may be any suitable message, such as an IGMP message, for triggering or initiating a network response (e.g., a multicast event). For example, emulation module 202 may generate a channel leave request and a channel join request for every channel change event associated with each of a plurality of emulated user devices. In this example, each request may include parameters (e.g., a device identifier and a user identifier) or other information (e.g., preferred port or compression format) that corresponds to an associated emulated user device. For instance, emulation module 202 may emulate user devices with various identifiers and capabilities. When emulating user devices having different capabilities (e.g., processing speeds), emulation module 202 may send command requests for one emulated user device at a slower rate than a second emulated user device. As such, emulation module 202 may generate various set top delays or other issues for user devices during a test phase.

In some embodiments, emulation module 202 may generate one or more messages and store the messages for transmission. One or more stored messages may be sent based on triggers, such as network response messages, time, and/or other factors. For example, emulation module 202 may send command messages in response to particular messages from IPTV content provider(s) 102 or after a preconfigured time period. In another example, command messages may be sent randomly or pseudo-randomly (e.g., any time within a certain time period).

Emulation module 202 may send or initiate sending messages (e.g., generated command messages) to one or more nodes (e.g., IPTV content provider(s) 102) via communications interface(s) 200. For example, after generating a channel leave request message for a given user device, the channel leave request message may be sent via communications interface(s) 200 towards IP content provider(s) 102. The channel leave request message may traverse one or more links and/or nodes within access network 104 before arriving at IPTV content provider(s) 102.

Emulation module 202 may store or maintain information, e.g., state information for each emulated user device, in storage 204. For example, emulation module 202 may store or update relevant state information after sending a command message and/or after receiving a network response (e.g., from IPTV content provider(s) 102. Exemplary state information may include a user device identifier, user or subscriber identifier, device capabilities, current channel, channel history, preconfigured delays, parameters, or conditions. Emulation module 202 may also store timestamps or other information associated with generated messages. For example, emulation module 202 may store a timestamp indicating when a channel join request or a channel leave request message is sent or transmitted.

Storage 204 may be any suitable entity (e.g., a non-transitory computer readable medium) for storing information. For example, stored information may include data structures representing state information of emulated user devices. Stored information may also include one or more metrics, statistics, timestamps or other data calculated using network response and/or other information. For example, storage 204 may be used (e.g., by measurement module 206) to store one or more computed metrics associated with IPTV network 100. Exemplary metrics to be stored may include a set top box (STB) delay, a medium delay, a network delay, a user delay, a message generation delay, a processing metric, a channel join delay, a channel leave delay, a channel overlap metric, a multicast metric, a unicast metric, a node delay, a quality of service (QOS) metric, and/or a quality of experience (QoE) metric. Storage 204 may be accessible to various nodes and/or modules. Storage 204 may be co-located at IPTV test device 106 or located at a node distinct from IPTV test device 106.

Measurement module 206 may be any suitable entity (e.g., software executing on one or more processors) for monitoring network responses (e.g., detecting and/or receiving messages from IPTV content provider(s) 102 or access network 104) and/or for calculating one or more metrics associated with IPTV network 100. For example, measurement module 206 may monitor one or more connections (e.g., communications interface(s) 200) for IPTV data or other messages. Measurement module 206 or other module may mark or identify and/or store incoming messages, or portions thereof. For example, measurement module 206 may add timestamps to one or more received messages from IPTV content provider(s) 102. If measurement module 206 detects that a message is associated with a relevant network event and/or test event (e.g., receiving data for a different channel than previously received for a given user device), measurement module 206 may store relevant information (e.g., timestamp indicating when a first message associated with the different channel was received), retrieve or access needed information (e.g., timestamp indicating when a last message associated with the previous channel was received) and/or perform one or more measurements or calculations using the obtained information. For example, measurement module 206 may calculate various performance metrics (e.g., a set top box delay, a channel join delay, and a channel leave delay) associated with IPTV network 100.

In some embodiments, measurement module 206 may perform calculations prior to an emulation module 202 completing a cycle of IPTV commands for a user device. For example, a cycle may include one or more channel changing events or other IPTV events. In this example, a channel changing event (e.g., changing a user device from receiving data associated with a first channel to a second channel) may require a channel leave request for leaving the first channel and a channel join request for joining the second channel. In other examples, a channel change event may require a single message or request (e.g., a sole channel join request or a channel change request). While conventional test equipment stores statistics for a whole test period (e.g., a plurality of channel changing events), measurement module 206 may detect network responses (e.g., messages from access network 104 or IPTV content provider(s) 102) and, using information from the network responses, stored statistics, and/or other information, may perform calculations during the test period. Advantageously, by performing calculations earlier, performance metrics may be provided sooner (e.g., to a network operator or test entity) and, further, may require less resources (e.g., less information to be stored in storage 204).

It will be appreciated that the above described modules are for illustrative purposes and that features or portions of features described herein may be performed by different and/or additional modules, components, or nodes. For example, a test module may incorporate or include functionality of emulation module 202 and measurement module 206. In another example, functionality of measurement module 206 may be distributed or separated into two distinct modules or nodes.

Figure 3:
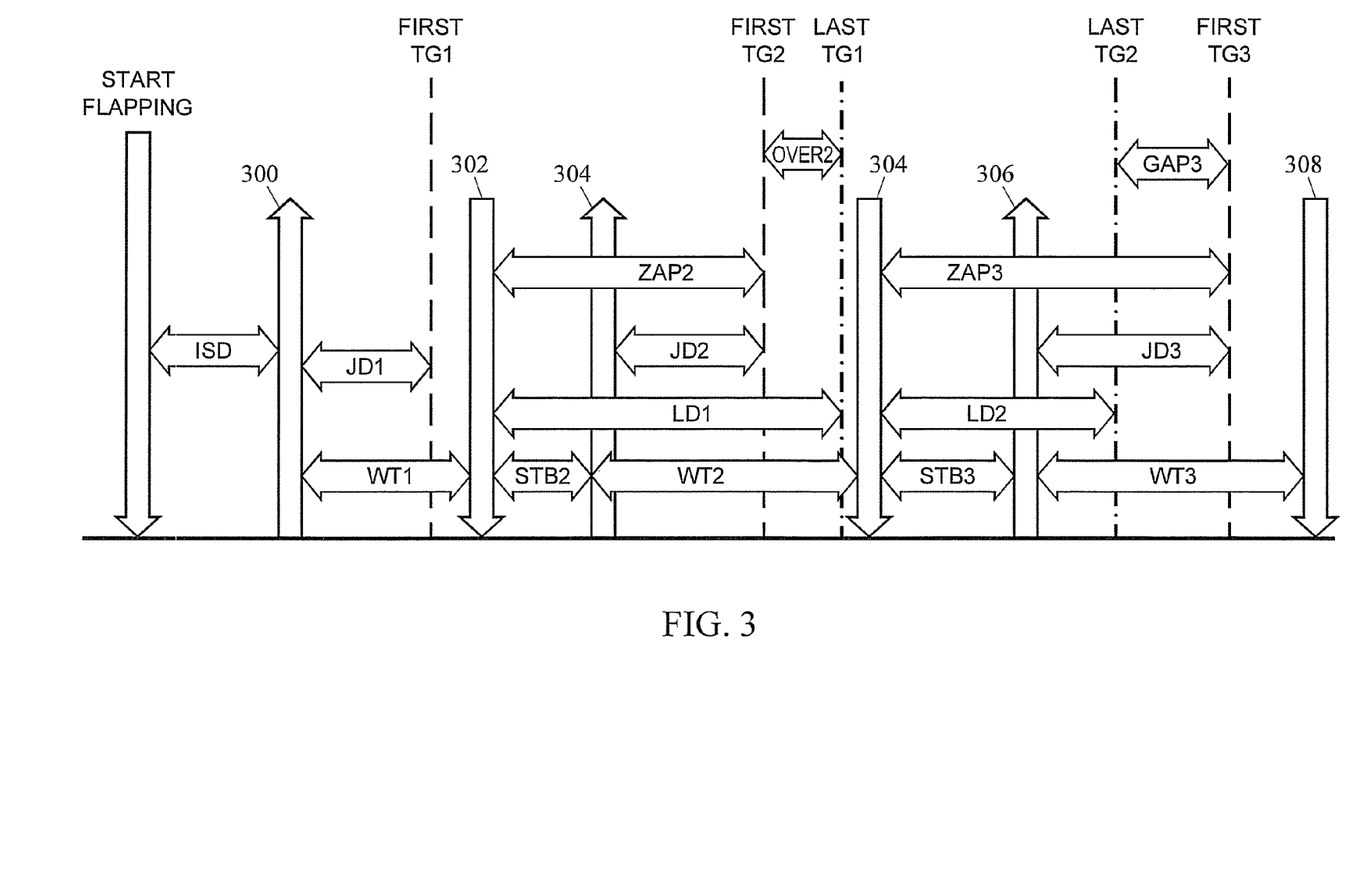
FIG. 3 is a diagram illustrating exemplary events associated with measuring multicast latency according to an embodiment of the subject matter described herein.

FIG. 3 is a diagram illustrating exemplary events associated with measuring multicast latency according to an embodiment of the subject matter described herein. In this embodiment, the timing diagram illustrates exemplary emulation and related metrics associated with a single emulated user device changing from channel "1" to channel "2" and from channel "2" to channel "3", where the user device is emulated and metrics are computed by IPTV test device 106. In other embodiments, IPTV test device 106 or related functionality may implement the same or similar functionality for each user device in a multi-user device test and may emulate and monitor more than three channels for each emulated user device.

In the timing diagram, the solid arrow labeled "TIME" represents time, dotted or dashed vertical lines represent when channel data was first received (e.g., "FIRST TG1") or when channel data was last received (e.g., "LAST TG1"), and numbered arrows represent transmissions of channel join requests (e.g., up arrows 300, 304, and 308) or transmissions of channel leave request (e.g., down arrows 302, 306, and 310). Horizontal arrows represent various delays and/or metrics and are labeled accordingly. For example, "ISD" arrow represents an initial start delay computed based on the time between the "powering on" of emulated user device (marked by "START FLAPPING" arrow) and the transmission of a first IPTV command (arrow 300). A "JDx" arrow represents a join delay computed based on the time between the transmission of a channel join request for a channel "x" and traffic or data for the channel "x" being first received (e.g., at IPTV test device 106). A "NA/Tx" arrow represents a watching time computed based on the time between the transmission of a channel join request for a channel "x" and the transmission of a channel leave request for the channel "x". A "LDx" arrow represents a leave delay computed based on the time between the transmission of a channel leave request for the channel "x" and traffic or data for the channel "x" being last received. A "ZAPx" arrow represents a zap or switch delay computed based on the time between the transmission of a channel leave request for the channel "w" and traffic or data for a channel "x" being first received. A "STBx" arrow represents a set top box delay computed based on the time between the transmission of a channel leave request for the channel "w" and the transmission of a channel join request for a channel "x".

An "OVERx" arrow represents a channel overlap period (e.g., where data from two channels are being received). A "GAPx" arrow represents a channel gap period (e.g., where data from no channels are being received). Both periods are computed based on the time between traffic or data for a channel "x" being first received and traffic or data for the channel "w" being last received. It will be appreciated that channel overlap periods and channel gap periods may be computed using the same information, but are named based on the whether two or zero channels are being received. For example, in overlap scenarios, data for a new channel is sent before data for an old channel is stopped and, as such, there is an overlap period where two channels are received. In contrast, in gap scenarios, data for an old channel stops before data for a new channel begins, and as such, there is a gap period where no channels are received.

In some embodiments, data (e.g., timestamps and received channel information) may be stored when the data is ascertainable and until a calculation using the data can be computed. For example, data associated with the previous and current channels for each emulated user device or IPTV subscriber may be stored. After a calculation is performed, stored data may be compressed or deleted from memory (e.g., storage 204). For example, after a channel join request for joining channel "2" is sent (arrow 304), a timestamp may be cached that is associated with a channel join request for joining channel "1" (arrow 300) and a timestamp may be cached that is associated with a channel leave request for leaving channel "1" (arrow 302). After a channel leave request for leaving channel "2" is sent (arrow 306), a timestamp may be cached for the first received packet associated with channel "1" and a timestamp may be cached for the last received packet associated with channel "1". After a channel join request for joining channel "3" is sent (arrow 308), a timestamp may be cached that is associated with a channel join request for joining channel "2" (arrow 304) and a timestamp may be cached that is associated with a channel leave request for leaving channel "2" (arrow 306).

Using relevant timestamps and/or other information, metrics and/or statistics may be computed. For example, after caching or storing timestamps associated with channels "1" and "2" and after sending a join request for joining channel "3", calculations may be performed (e.g., by IPTV test device 106) to determine watching time on channel "1", join delay for channel "1", and leave delay for channel "1". After performing the calculations associated with channel "1", timestamps and/or other information associated with channel "1" may be deleted. Similar calculations and data maintenance functions may be performed for subsequent received channels and associated data. For example, after sending a join request for joining channel "4" (not shown) or a message for ending a testing phase, calculations may be performed to determine watching time on channel "2", join delay for channel "2", and leave delay for channel "2".

In some embodiments, one or more state machines may be used to determine data (e.g., channel packets and related timestamps) to store, data to process, and/or calculations to perform. For example, each emulated IPTV user device may be associated with a separate state machine. In another example, a state machine may be associated with multiple emulated user devices or a test session. A state machine may be a high-level behavioral model for representing software and may include various states and transitions. For example, a state machine may represent software executing on test device 106, or a module thereof.

In some embodiments, a state machine for performing one or more latency related calculations associated with one or more emulated IPTV user devices may be used. The state machine may include a collection state, a measurement state, a purge or deletion state, and an end state. After startup of the measurement state machine, a collection state may be entered. The collection state may include receiving data, such as channel packets. The collection state may also be associated with time stamping relevant packets, and caching or storing the packets or information therein (e.g., number of packets received, a media rate, and encoding information).

A transition may include one or more actions or triggers that start in one state and may end in another state or the same state. For example, after data has been collected for two channels and after a join request has been transmitted for a third channel, the measurement state may be entered. The measurement state may include performing calculations associated with the two channels using the data stored during the collection state. The measurement state may also be associated with reporting or storing feedback (e.g., latency related calculations) for a user or other entity.

After calculations are performed, the purge state may be entered. The purge state includes removing superfluous or unneeded data from storage 204. For example, if all calculations associated with a given channel are performed, then data associated with that channel may be compressed or deleted from storage 204.

After deleting or compressing data, various transitions may occur. For example, if additional network responses are received or if additional test events are performed, the measurement state may be (re)entered. In another example, if a testing phase is completed or a test stops (e.g., unexpectantly), the end state may be entered.

The end state may include processing any remaining data or calculations, reporting errors, and deleting unneeded data or state information. For example, the end state may be associated with logic such that all remaining calculations that can be performed are performed and any calculations that cannot be performed (e.g., calculations that require data not received before the test was stopped) are recorded and/or reported to a user or other entity. After remaining calculations are performed and errors are reported, data, including channel information and state machine information, that is no longer needed may be deleted or compressed (e.g., from storage 204).

It will be appreciated that the above described state machine is for illustrative purposes. In some embodiments, a state machine for performing one or more functions described herein may include additional and/or different states. Further, in some embodiments, transitions between states for a given state machine may be different.

As stated above, performing calculations during a cycle of channel changes for a given user rather than waiting until the cycle repeats allows less information to be cached at a given time and allows reports to be generated in real time. For example, the cycle in the timing diagram may repeat after the event marked by arrow 310 by starting again with the event marked by arrow 300. Calculating the various latency metrics illustrated in the timing diagram before such repetition decreases the amount of information that must be cached at a given time and, as such, allows metrics and/or other feedback to be reported in real time or near real time.

Figure 4:
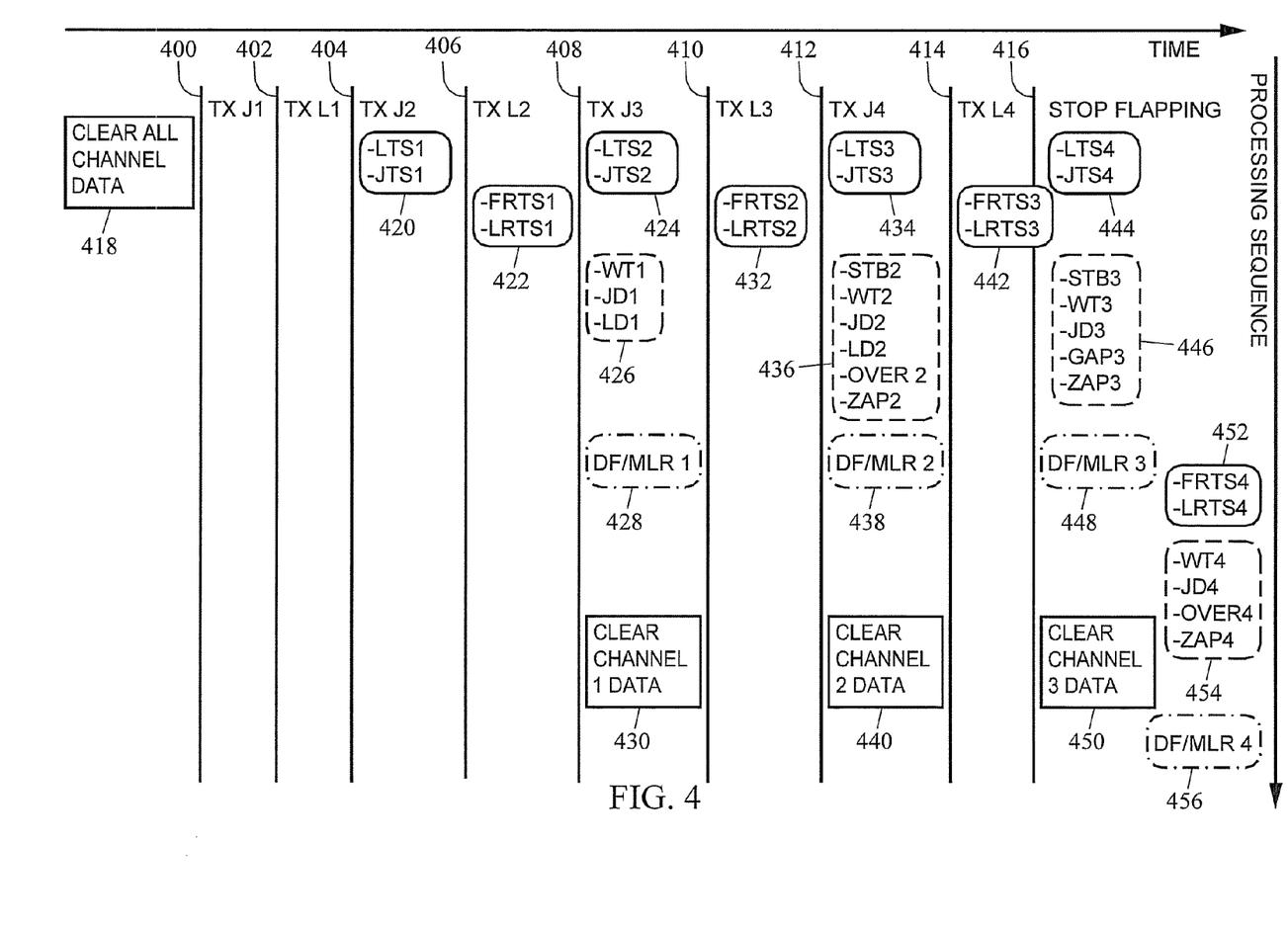
FIG. 4 is a diagram illustrating an exemplary processing sequence associated with measuring multicast latency according to an embodiment of the subject matter described herein.

FIG. 4 is a diagram illustrating an exemplary processing sequence associated with measuring multicast latency according to an embodiment of the subject matter described herein. In some embodiments, the exemplary processing sequence described herein, or portions thereof, may be performed by an IPTV test device 106, emulation module 202, or measurement module 206.

In this embodiment, the processing sequence diagram illustrates exemplary IPTV related metrics associated with a single emulated user device changing from channel "1" to channel "2", from channel "2" to channel "3", and from channel "3" to channel "4", where the user device is emulated and metrics are computed by IPTV test device 106. In other embodiments, IPTV test device 106 or related functionality may implement the same or similar functionality for each user device in a multi-user device test and may emulate and monitor more than four channels for each emulated user device.

In the processing sequence diagram, the horizontal arrow labeled "TIME" represents time and the vertical arrow labeled "PROCESSING SEQUENCE" represents processing sequence or processing order of various actions. For example, a recent event (such as stop flapping request 416) may be located towards the right of the horizontal arrow, while a less recent event (such as Tx J1 400) may be located towards the left of the horizontal arrow. In another example, a first action (e.g., determining a timestamp associated with joining channel "2" (JTS2)) to be performed may appear near the top of the vertical arrow, while a second action (e.g., determining a watching time for channel "1" (WT1)) that is to be performed after the first action may appear under or below the first action.

Vertical lines represent various events that may occur during a testing phase. For example, transmissions of channel join requests (e.g., Tx J1 400, Tx J2 404, Tx J3 408, and Tx J4 412), transmissions of channel leave requests (e.g., Tx L1 402, Tx L2 406, Tx L3 410, and Tx L4 414), and transmission of a "Stop Flapping" request (STOP FLAPPING 416) are depicted in FIG. 4.

Various boxes represent one or more actions to be performed or processed by IPTV test device 106, or a module thereof. In some embodiments, actions within a box may indicate that actions are to be performed or processed simultaneously, concurrently, or contemporaneously. In other embodiments, actions within a box may be processed independently or separately.

In the processing sequence diagram, rounded edge, solid line (RESL) boxes represent one or more measurements or timestamps to be determined (e.g., RESL boxes 420, 422, 424, 426, 432, 434, 442, 444, and 452). Rounded edge, dashed line (REDL) boxes represent one or more multicast or latency related statistics to be determined (e.g., REDL boxes 426, 436, 446, and 454). Rounded edge, dash and dot line (REDDL) boxes represent media delivery index (MDI) statistics to be determined (e.g., REDDL boxes 428, 438, 448, and 456). Straight edge, solid line (SESL) boxes represent deletion or purge commands (e.g., clear channel data commands) to be performed (e.g., SESL boxes 418, 430, 440, and 450).

In some embodiments, at an initial time (e.g., at a start flapping request or at the beginning of a testing phase), memory used for testing may be cleared. For example, IPTV test device 106 may perform a clear all channel data command 418. During the testing phase, various timestamps, measurements, or statistics (e.g., number of packets received for a given channel) may be determined. For example, after a join request for channel "1" is sent (Tx J1 400), a leave request for channel "1" is sent (Tx L1 402), and a join request for channel "2" is sent (Tx J2 404), timestamps (e.g., LTS1 and JTS1) may be determined and cached that are associated with joining channel "1" and with leaving channel "1" (RESL box 420).

After a leave request for channel "2" is sent (Tx L2 406), a timestamp may be determined and cached for the first received packet associated with channel "1" and a timestamp may be determined and cached for the last received packet associated with channel "1" (RESL 422). After a join request for channel "3" is sent (Tx J3 408), timestamps (e.g., LTS2 and JTS2) may be determined and cached that are associated with joining channel "2" and with leaving channel "2" (RESL box 424).

After processing or performing actions associated with RESL box 424, multicast related statistics (e.g., REDL box 426) may be determined. For example, calculations may be performed (e.g., by IPTV test device 106) to determine a watching time for channel "1", a join delay for channel "1", and/or a leave delay for channel "1".

After processing or performing actions associated with REDL box 426, one or more MDI related statistics (e.g., REDDL box 428) may be determined. For example, the delay factor and media loss rate (DF/MLR) may be determined. Delay factor may be computed by determining how many packets are received minus how many packets are being used and dividing the result by a media rate. Delay factor may be a time value indicating how many milliseconds' worth of data must be buffered to avoid jitter. MLR may be computed by determining the number of packets expected to be received minus the number of packets actually received and dividing the result by an interval time.

After processing or performing actions associated with REDDL box 428, unneeded channel data may be deleted. For example, IPTV test device 106 may perform a clear channel 1 data command (SESL box 430).

Similar actions may be performed or processed for subsequent channel leave and join requests. For example, after a leave request for channel "3" is sent (Tx L3 410), a timestamp may be determined and cached for the first received packet associated with channel "2" and a timestamp may be determined and cached for the last received packet associated with channel "2" (RESL 432). After a join request for channel "4" is sent (Tx J4 412), timestamps (e.g., LTS3 and JTS3) may be determined and cached that are associated with joining channel "3" and with leaving channel "3" (RESL box 434).

After processing or performing actions associated with RESL box 434, multicast related statistics (e.g., REDL box 436) may be determined. For example, calculations may be performed (e.g., by IPTV test device 106) to determine a set top box delay for switching from channel "1" to channel "2", a watching time for channel "2", a join delay for channel "2", a leave delay for channel "2", a channel overlap period, and/or a zap delay.

After processing or performing actions associated with REDL box 436, one or more MDI related statistics (e.g., REDDL box 438) may be determined. After processing or performing actions associated with REDDL box 438, unneeded channel data may be deleted. For example, IPTV test device 106 may perform a clear channel 2 data command (SESL box 440).

After a channel leave request for leaving channel "4" is sent (Tx L4 414), a timestamp may be determined and cached for the first received packet associated with channel "3" and a timestamp may be determined and cached for the last received packet associated with channel "3" (RESL 442). After the end of the testing phase or a "Stop Flapping" request (STOP FLAPPING 416), timestamps (e.g., LTS4 and JTS4) may be determined and cached that are associated with joining channel "4" and with leaving channel "4" (RESL box 444).

After processing or performing actions associated with RESL box 444, multicast related statistics (e.g., REDL box 446) and MDI related statistics (e.g., REDDL box 448) may be determined. After processing or performing actions associated with REDDL box 448, unneeded channel data may be deleted. For example, IPTV test device 106 may perform a clear channel 3 data command (SESL box 450).

At some subsequent time (e.g., prior to a testing phase or testing cycle being repeated), a timestamp may be determined and cached for the first received packet associated with channel "4" and a timestamp may be determined and cached for the last received packet associated with channel "4" (RESL 452) and multicast related statistics (e.g., REDL box 454) and MDI related statistics (e.g., REDDL box 456) may be determined.

It will be appreciated that the above described processing sequence is for illustrative purposes. In some embodiments, a processing sequence may include additional and/or different processing sequences. For example, in one embodiment, various MDI statistics may be computed prior to computing multicast latency related statistics. Further, it will be appreciated that processing sequence may be affected based on one or more factors, such as equipment, network conditions, statistics to be determined, and/or testing events or procedures.

Figure 5:
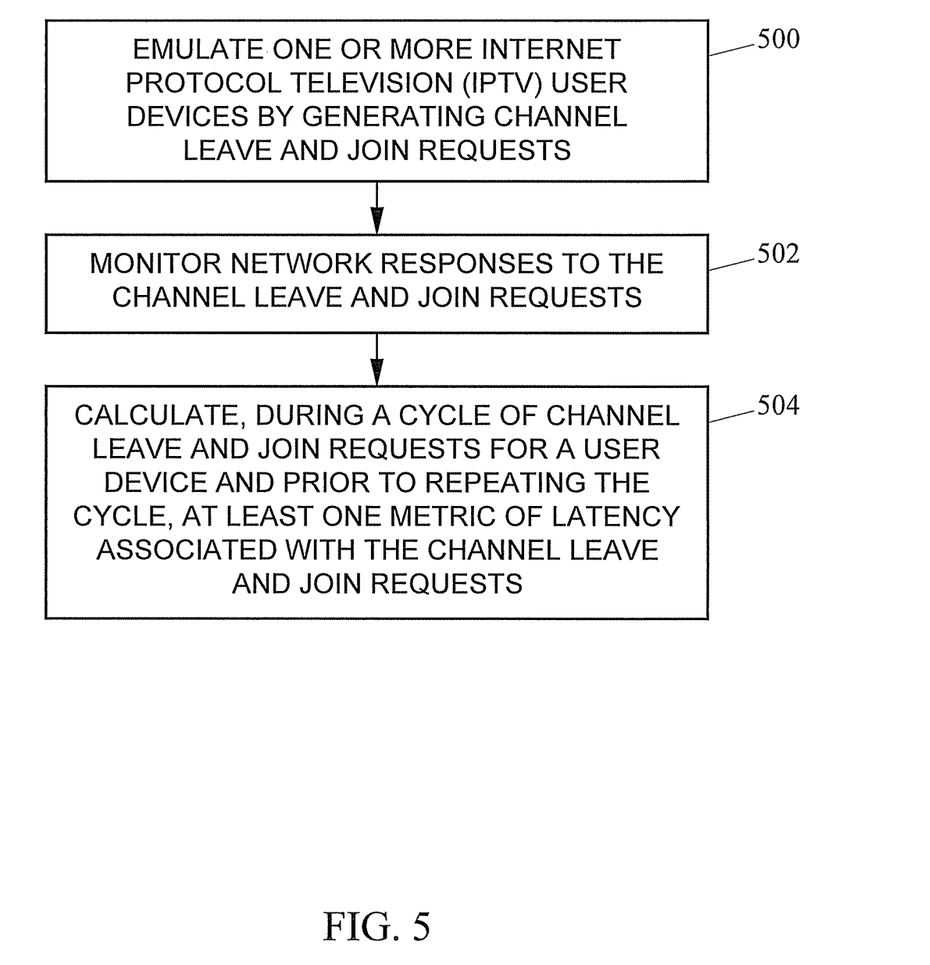
FIG. 5 is a diagram illustrating an exemplary process for measuring multicast latency according to an embodiment of the subject matter described herein.

FIG. 5 is a diagram illustrating an exemplary process for measuring multicast latency according to an embodiment of the subject matter described herein. In some embodiments, the exemplary process described herein, or portions thereof, may be performed by an IPTV test device 106, emulation module 202, or measurement module 206.

In step 500, one or more IPTV user devices may be emulated by generating channel leave and join requests. For example, emulation module 202 may emulate one thousand user devices for testing. During testing, emulation module 202 may trigger or initiate multiple testing events for each emulated user device. For example, emulation module 202 may generate multiple channel leave requests and channel join requests for each emulated user device. The requests may be sent to an IPTV node, such as IPTV content provider(s) 102 via access network 104. Each request may be sent randomly, pseudo-randomly, or based on triggers or other factors, such as a priority level or processing speed associated with an emulated user device or in response to a message from IPTV content provider(s) 102 or other nodes.

In some embodiments, a channel leave request and/or a channel join request may be used to trigger a channel changing event or multicast event. For example, a channel leave request may trigger an IPTV node to disassociate a user device and a particular multicast group (e.g., a group of IP addresses that receives data from the channel to leave), while a channel join request may trigger an IPTV node to associate the user device and a different multicast group (e.g., a group of IP addresses that receives data from the channel to join).

In step 502, network responses to the channel leave and join request may be monitored. For example, in a scenario where multiple devices are emulated and multiple channel changing events occur, various messages (e.g., data packets arriving having different multicast source addresses than previous packets) associated with the channel changing events may be received. In some instances, such as where multiple links or routers within access network 104 connect to IPTV test device 106, response messages may arrive along different links and/or in a different order from which corresponding requests were sent.

In step 504, at least one metric of latency associated with the channel leave and join requests may be calculated during a cycle of channel leave and join requests for a user device and prior to repeating the cycle. For example, a cycle of channel leave and join requests for a user device may include a channel leave request (e.g., for leaving channel "1") and a channel join request (e.g., for joining channel "2"). After generating and sending the cycle of requests and before generating and sending another cycle of requests, various metrics may be computed using received and/or retrieved information (e.g., from storage 204). For example, using a timestamp indicating when a request for joining channel "2" was sent (JTS2) and a timestamp indicating when data from a channel "2" was first received (FRTS2), a join delay may be calculated (FRTS2-JTS2). In another example, using a timestamp indicating when a request for leaving channel "1" was sent (LTS1) and a timestamp indicating when data from a channel "1" was last received (LRTS1), a leave delay may be calculated (LRTS1-LTS1).

In some embodiments, after calculations are performed, stored data (e.g., timestamps, statistics, or channel data) may be deleted. For example, after performing calculations associated with a channel changing event, IPTV test device 106 or measurement module 206 may delete all received traffic for a previous channel from storage 204.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for measuring multicast latency, the method comprising:
    emulating one or more Internet protocol television (IPTV) user devices by generating channel leave and join requests during a test period;
    monitoring network responses to the channel leave and join requests; and
    calculating, during a cycle of channel leave and join requests for each user device and prior to repeating the cycle, wherein the cycle of channel leave and join requests for each user device occurs during the test period, at least one metric of multicast latency associated with the channel leave and join requests.

2. The method of claim 1 wherein the cycle of channel leave and join requests for each user device includes a channel leave request and a channel join request.

3. The method of claim 1 comprising:
at an IPTV node:
receiving the channel leave and join requests; and
performing at least one multicast event.

4. The method of claim 3 wherein performing the at least one multicast event includes disassociating the user device and a first multicast group that receives a first IPTV channel.

5. The method of claim 3 wherein performing the at least one multicast event includes associating the user device and a second multicast group that receives a second IPTV channel.

6. The method of claim 3 wherein performing the at least one multicast event includes providing data associated with an IPTV channel to a user device.

7. The method of claim 1 wherein emulating two or more Internet protocol television (IPTV) user devices by generating channel leave and join requests includes sending, by at least one signaling interface, the channel leave and join requests to an IPTV node.

8. The method of claim 1 wherein monitoring network responses to the channel leave and join requests includes receiving, by at least one signaling interface, messages from an IPTV node.

9. The method of claim 1 wherein the at least one interface is associated with multiple links in an IPTV access network.

10. The method of claim 1 wherein the at least one metric of multicast latency includes a set top box (STB) delay, a medium delay, a network delay, a user delay, a message generation delay, a processing metric, a channel join delay, a channel leave delay, a channel overlap metric, a unicast metric, a node delay, a quality of service (QoS) metric, or a quality of experience (QoE) metric.

11. A system for measuring multicast latency, the system comprising:
an emulation module configured to emulate two or more Internet protocol television user devices by generating channel leave and join requests during a test period; and
a measurement module embodied in a non-transitory computer readable medium configured to monitor network responses to the channel leave and join requests and to calculate, during a cycle of channel leave and join requests for each user device and prior to repeating the cycle, wherein the cycle of channel leave and join request for each user device occurs during the test period, at least one metric of multicast latency associated with the channel leave and join requests.

12. The system of claim 11 wherein the cycle of channel leave and join requests for each user device includes a channel leave request and a channel join request.

13. The system of claim 11 comprising:
an IPTV node configured to receive the channel leave and join requests and to perform at least one multicast event.

14. The system of claim 13 wherein the IPTV node is configured to disassociate a user device and a first multicast group that receives a first IPTV channel.

15. The system of claim 13 wherein the IPTV node is configured to associate a user device and a second multicast group that receives a second IPTV channel.

16. The system of claim 13 wherein the IPTV node is configured to provide data associated with an IPTV channel to the user device.

17. The system of claim 11 wherein the emulation module is configured to send, using at least one signaling interface, the channel leave and join requests to an IPTV node.

18. The system of claim 11 wherein the emulation module is configured to receive, using at least one signaling interface, messages from an IPTV node.

19. The method of claim 11 wherein the at least one interface is associated with multiple links in an IPTV access network.

20. The system of claim 11 wherein the at least one metric of multicast latency includes a set top box (STB) delay, a medium delay, a network delay, a user delay, a message generation delay, a processing metric, a channel join delay, a channel leave delay, a channel overlap metric, a unicast metric, a node delay, a quality of service (QOS) metric, or a quality of experience (QoE) metric.

21. A non-transitory computer readable medium comprising computer executable instructions embodied in a computer readable medium that when executed by a processor of a computer control the computer to perform steps comprising:
emulating two or more an Internet protocol television (IPTV) user devices by generating channel leave and join requests during a test period;
monitoring network responses to the channel leave and join requests; and
calculating, during a cycle of channel leave and join requests for each user device and prior to repeating the cycle, wherein the cycle of channel leave and join request for each user device occurs during the test period, at least one metric of multicast latency associated with the channel leave and join requests.

\* \* \* \* \*